(12) United States Patent
Kang et al.

(10) Patent No.: US 7,718,565 B2
(45) Date of Patent: May 18, 2010

(54) METHOD FOR PREPARING SOLID CATALYSTS FOR ETHYLENE POLYMERIZATION AND COPOLYMERIZATION

(75) Inventors: Kap-Ku Kang, Ulsan-si (KR); Byung-Ju Park, Ulsan-si (KR); Jae-Kwon Jang, Ulsan-si (KR); Young-Tae Jeong, Ulsan-si (KR)

(73) Assignee: Korea Petrochemical Ind. Co., Ltd., Ulsan-si (KR)

( * ) Notice: Subject to any disclaimer, the term of this patent is extended or adjusted under 35 U.S.C. 154(b) by 447 days.

(21) Appl. No.: 11/577,273

(22) PCT Filed: Oct. 14, 2005

(86) PCT No.: PCT/KR2005/003431
§ 371 (c)(1),
(2), (4) Date: Apr. 13, 2007

(87) PCT Pub. No.: WO2006/041264
PCT Pub. Date: Apr. 20, 2006

(65) Prior Publication Data
US 2007/0259777 A1 Nov. 8, 2007

(30) Foreign Application Priority Data
Oct. 14, 2004 (KR) .................. 10-2004-0082334

(51) Int. Cl.
*C08F 4/64* (2006.01)
*C08F 4/642* (2006.01)
*C08F 4/643* (2006.01)
*C08F 4/649* (2006.01)

(52) U.S. Cl. ............. 502/116; 502/104; 502/115; 502/125; 526/124.9; 526/125.1; 526/125.3

(58) Field of Classification Search .......... 502/104, 502/112, 125, 115, 116; 526/124.8, 125.3, 526/124.9, 125.1
See application file for complete search history.

(56) References Cited

U.S. PATENT DOCUMENTS 4,883,848 A 11/1989 Suga et al.
5,153,158 A 10/1992 Kioka et al.
5,844,046 A 12/1998 Ohgizawa et al.
6,762,145 B2 * 7/2004 Yang et al. ............ 502/103
6,803,427 B2 * 10/2004 Yang et al. ............ 526/123.1
6,958,378 B2 * 10/2005 Yang et al. ............ 526/352
2002/0037980 A1 * 3/2002 Yang et al. ............ 526/125.3

FOREIGN PATENT DOCUMENTS

| EP | 435332 B1 | 4/1997 |
|---|---|---|
| KR | 10-0137119 B1 | 4/1998 |
| KR | 10-0416181 B1 | 1/2004 |
| KR | 1020010053664 A | 7/2007 |

\* cited by examiner

*Primary Examiner*—Caixia Lu
(74) *Attorney, Agent, or Firm*—Rothwell, Figg, Ernst & Manbeck, P.C.

(57) ABSTRACT

The present invention relates to a method for preparing a solid catalyst for ethylene polymerization and/or copolymerization. More specifically, the present invention relates to a solid titanium catalyst supported in a magnesium support which has an extremely high catalytic activity, advantageous catalyst shape and a simple preparation process, capable of producing a polymer with a high bulk density, a narrow and uniform particle size distribution and a broad molecular weight distribution, and a method for preparation of the same. A silicon-containing magnesium compound is prepared by reacting an electron donor such as a silicon compound containing an alkoxy group of Formula 1, a silicon compound containing an alkoxy group of Formula 2, or a mixture thereof in a magnesium compound solution, and reacted with a titanium compound to obtain the solid catalyst of the present invention.

$$Si(R^1)(R^2)(OR^3)_2 \qquad \text{[Formula 1]}$$

wherein $R^1$ is trimethylsilylmethyl or 2-phenylpropyl;
$R^2$ is linear, cyclic or branched alkyl of $C_3$-$C_6$ such as 1-hexyl, cyclohexyl, cyclopentyl, n-butyl, iso-butyl or propyl; and
$R^3$ is alkyl of $C_1$-$C_3$.

$$R^1{}_a R^2{}_b Si(OR^3)_{4-(a+b)} \qquad \text{[Formula 2]}$$

wherein $R^1$ and $R^2$ are individually hydrocarbon of $C_1$-$C_{12}$;
$R^3$ is hydrocarbon of $C_1$-$C_5$; and
$a=0$ or 1, $b=0$ or 1.

9 Claims, No Drawings

METHOD FOR PREPARING SOLID CATALYSTS FOR ETHYLENE POLYMERIZATION AND COPOLYMERIZATION

CROSS REFERENCE TO RELATED APPLICATIONS

This application is a 35 USC §371 National Phase Entry Application from PCT/KR2005/003431, filed Oct. 14, 2005, and designating the United State. This application claims priority under 35 U.S.C. 119 based on Korean patent application No. 10-2004-0082334 filed Oct. 14, 2004, which is incorporated herein by reference in its entirety.

TECHNICAL FIELD

The present invention generally relates to a method for preparing solid catalysts for ethylene polymerization and/or copolymerization. More specifically, the present invention relates to a simple method for preparing solid catalysts for ethylene polymerization and/or copolymerization which has an extremely high catalytic activity and an advantageous catalyst shape, capable of producing a polymer with a high bulk density, a narrow and uniform particle size distribution and a broad distribution of molecular weight.

BACKGROUND OF THE INVENTION

In general, a catalyst for ethylene polymerization and copolymerization containing magnesium has been known to have an extremely high activity, serve to prepare a polymer with a high bulk density, and be suitable for liquid and gaseous polymerization.

Ethylene liquid polymerization refers to a polymerization process performed in the medium such as bulk ethylene, hexane or iso-pentane. Catalysts used in this process feature the high activity, the bulk density of the prepared polymer and the content of the low molecular weight soluble in the medium. Of these features, the activity of catalysts is one of the most important characteristics. Moreover, the molecular weight distribution is an important variable to determine the property of the ethylene polymer, and the broad molecular weight distribution is an important characteristic depending on use of the polymer.

As the prior art, a catalyst for olefin polymerization based on titanium containing magnesium and a process for preparing the same have been reported. A method using a magnesium solution has been well known as the process for preparing olefin polymerization catalysts to obtain a polymer having a high bulk density.

The U.S. Pat. No. 4,330,649 discloses a method for obtaining a magnesium solution by the contact reaction of a magnesium compound with an electron donor such as alcohol, amine, organic carboxylic acid and aldehyde under the presence of a hydrocarbon solution. Also, a method for preparing a magnesium-supported catalyst by reacting the liquid magnesium solution with a titanium compound containing halogen such as titanium tetrachloride and electron donors such as organic acid ester, organic acid halide, anhydrous organic acid has been well known. Although the above-described catalyst provides a high bulk density, it has disadvantage that its catalytic activity is required to be improved, and the process for preparing it is performed through many steps.

The U.S. Pat. No. 5,459,116 discloses a method for preparing a supported titanium catalyst by the contact reaction of a titanium compound with a magnesium solution containing ester having not a silicon compound but at least one hydroxyl group as an electron donor. The polymer by the catalyst has a high bulk density and an ultra high molecular weight, but the activity of the catalyst is required to be improved.

The U.S. Pat. No. 4,843,049 discloses a method for preparing a catalyst having a high titanium content by reacting titanium alkoxides with magnesium chloride-ethanol support manufactured by a spray drying method and then reacting diethylaluminum chloride or ethylaluminum sesquichloride. The method provides a high bulk density, and the activity of the catalyst increases as the titanium content becomes higher. However, the catalytic activity is extremely low so that it is required to be improved.

The U.S. Pat. Nos. 4,847,227, 4,816,433 and 4,829,037 disclose a method for preparing a catalyst by reacting a titanium chloride compound with electron donors such as magnesium alkoxide, dialkyl phthalate, dialkyl terephthalate under the presence of aromatic hydrocarbon solvent.

The U.S. Pat. Nos. 4,970,186 and 5,130,284 disclose a method for preparing a catalyst for olefin polymerization providing an advantageous polymerization activity and an improved bulk density of an obtained polymer by reacting a titanium chloride compound with electron donors such as magnesium alkoxide and phthaloyl chloride.

DETAILED DESCRIPTION OF THE PREFERRED EMBODIMENTS

Technical Subject

As described above, a catalyst for ethylene polymerization and copolymerization has been required which has a high polymerization activity, a simple manufacturing process, an advantageous catalyst shape, and produces a polymer with a narrow and uniform particle size distribution, a high bulk density and a broad molecular weight distribution. When a polymer is processed as a powder (hereinafter referred to as "PWD") type, the bulk density of the polymer is an important factor in PWD packing and productivity. The molecular weight distribution of the polymerized polymer is an important factor in processability and property of the polymer. The narrower molecular weight distribution degrades the processability and causes a limit of rigidity in a molten state so that the shape is deformed and reduced. As a result, it is difficult to apply the polymer to a large-diameter pipe or a large-scale blow molding product which requires a high mechanical resistance in the molten state. Further, when the molecular weight of the polymer is increased to improve tensile strength, the processability is degraded so that a cracked gap is generated in processing. In order to overcome these problems, a catalyst for preparing a polymer having a broad molecular weight has been required.

The object of the present invention is to solve the above-described problems, namely to provide a method for preparing a solid catalyst for ethylene polymerization and/or copolymerization by reacting a magnesium compound with a silicon compound containing an alkoxy group of Formula 1, a silicon compound containing an alkoxy group of Formula 2, or a mixture thereof as an electron donor to obtain the silicon-containing magnesium compound, and then reacting it in a titanium compound.

$$Si(R^1)(R^2)(OR^3)_2 \qquad \text{[Formula 1]}$$

wherein $R^1$ is trimethylsilylmethyl or 2-phenylpropyl;

$R^2$ is linear, cyclic or branched alkyl of $C_3$-$C_6$ such as 1-hexyl, cyclohexyl, cyclopentyl, n-butyl, iso-butyl or propyl; and $R^3$ is alkyl of $C_1$-$C_3$.

$$R^1{}_a R^2{}_b Si(OR^3)_{4-(a+b)} \quad \text{[Formula 2]}$$

wherein $R^1$ and $R^2$ are individually hydrocarbon of $C_1$-$C_{12}$; $R^3$ is hydrocarbon of $C_1$-$C_5$; and
a=0 or 1, b=0 or 1.

The present invention relates to a novel method for preparing a catalyst for ethylene polymerization and/or copolymerization which provides a high catalytic activity and an advantageous and uniform catalyst shape, and produces a polymer with a high bulk density, and a broad molecular weight distribution.

Technical Solution

In order to achieve the above-described object, there is provided a method for preparing solid catalysts for ethylene polymerization and/or copolymerization. The method comprises the steps of:

reacting a magnesium compound solution with a silicon compound containing an alkoxy group to obtain a silicon-containing magnesium compound solution; and adding the silicon-containing magnesium compound solution in a titanium compound.

Hereinafter, the method for preparing a solid catalyst for ethylene polymerization and/or copolymerization is described in more detail.

(1) Step for Preparation of Magnesium Compound Solution

When a solid catalyst for ethylene polymerization and/or copolymerization is prepared in one embodiment of the present invention, a magnesium compound solution obtained by conventionally well-known method can be used. In one example of the present invention, a magnesium solution can be obtained by reacting a magnesium compound with an alcohol under the presence of a solvent.

The magnesium compound of the present invention is at least one compound selected from the group consisting of: magnesium halide of magnesium fluoride, magnesium chloride, magnesium bromide or magnesium iodide; alkyl magnesium halide such as methyl magnesium halide, ethyl magnesium halide, propyl magnesium halide, butyl magnesium halide, isobutyl magnesium halide or hexyl magnesium halide; alkoxy magnesium halide such as methoxy magnesium halide, ethoxy magnesium halide, isopropoxy magnesium halide, butoxy magnesium halide or octoxy magnesium halide; aryloxy magnesium halide such as phenoxy magnesium halide or methyl phenoxy magnesium halide; and dialkoxy magnesium such as dimethoxy magnesium, diethoxy magnesium, dibutoxy magnesium and dioctoxy magnesium.

The magnesium compound solution of the present invention can be prepared using a solvent. As the solvent, a hydrocarbon solvent can be used. The hydrocarbon solvent is at least one compound selected from the group consisting of aliphatic hydrocarbon such as pentane, hexane, cyclohexane, methylcyclohexane, heptane, octane, decane, undecane, dodecane, tridecane and tetradecane, aromatic hydrocarbon such as benzene, toluene, xylene and ethylbenzene, and halogenated hydrocarbon such as dichloropropane, dichloroethylene, trichloroethylene, carbon tetrachloride and chlorobenzene.

Although the kind and the required amount of the solvent are determined under consideration of workability and economic efficiency, the required amount of the solvent which affects the shape of the catalyst is preferably ranging from 0.1 to 40 mol based on 1 mol of the magnesium compound.

While the magnesium compound is prepared into a magnesium compound solution, alcohol can be used under the presence of the above-described solvent. Here, the alcohol can be that of $C_1$-$C_{20}$, and selected from the group consisting of methanol, ethanol, propanol, butanol, pentanol, hexanol, octanol, decanol, 2-ethyl hexanol, dodecanol, octadecyl alcohol and benzyl alcohol.

Although a desired mean particle size (i.e., mean diameter) and particle size distribution of the catalyst vary depending on kinds of the magnesium compound, kinds and the amount of the alcohol and the ratio of magnesium compound to alcohol, the required amount of the alcohol for obtaining a desired magnesium solution is ranging from 1.0 to 10 mol based on 1 mol of the magnesium compound.

In preparation of the magnesium solution according to the present invention, the reaction of the magnesium compound with the alcohol is performed under the presence of the solvent. Although the reaction condition varies depending on kinds and the amount of magnesium compound, alcohol and solvent, the magnesium solution may be preferably obtained at a temperature ranging from 10° C. to 150° C. for 30 minutes to 5 hours to prepare desired solid catalysts.

(2) Step for Obtaining a Silicon-Containing Magnesium Compound Solution

The magnesium compound solution obtained from the step (1) is reacted with a silicon compound containing an alkoxy group as an electron donor, thereby obtaining a silicon-containing magnesium compound solution.

The silicon compound containing an alkoxy group of the present invention is a silicon compound containing an alkoxy group of Formula 1, a silicon compound containing an alkoxy group containing Formula 2 or a mixture thereof with the weight ratio of 1:9~9:1.

$$Si(R^1)(R^2)(OR^3)_2 \quad \text{[Formula 1]}$$

wherein $R^1$ is trimethylsilylmethyl or 2-phenylpropyl;

$R^2$ is linear, cyclic or branched alkyl of $C_3$-$C_6$ such as 1-hexyl, cyclohexyl, cyclopentyl, n-butyl, iso-butyl or propyl; and $R^3$ is alkyl of $C_1$-$C_3$.

$$R^1{}_a R^2{}_b Si(OR^3)_{4-(a+b)} \quad \text{[Formula 2]}$$

wherein $R^1$ and $R^2$ are individually hydrocarbon of $C_1$-$C_{12}$; $R^3$ is hydrocarbon of $C_1$-$C_5$; and
a=0 or 1, b=0 or 1.

The above-described silicon compound containing an alkoxy group represented by Formula 1 is at least one compound selected from the group consisting of cyclopentyl(2-phenylpropyl)dimethoxysilane (CPPDMS), cyclopentyl(trimethylsilylmethyl)dimethoxysilane (CTSDMS), hexyl(2-phenylpropyl)dimethoxysilane (HPPDMS), cyclohexyl(2-phenylpropyl)dimethoxysilane (CHPPDMS), n-butyl(2-phenylpropyl)dimethoxysilane (NBPPDMS), iso-butyl(2-phenylpropyl)dimethoxysilane (IBPPDMS), propyl(2-phenylpropyl)dimethoxysilane (PPPDMS), hexyl(trimethylsilylmethyl)dimethoxysilane (HTSDMS), cyclohexyl(trimethylsilylmethyl)dimethoxysilane (CHTSDMS), n-butyl(trimethylsilylmethyl)dimethoxysilane (NBTSDMS), iso-butyl(trimethylsilylmethyl)dimethoxysilane (IBTSDMS) and propyl(trimethylsilylmethyl)dimethoxysilane (PTSDMS).

The above-described silicon compound containing an alkoxy group represented by Formula 2 is at least one compound selected from the group consisting of dimethyldimethoxysilane, dimethyldiethoxysilane, dicyclopentyldimethoxysilane, cyclohexylmethyldimethoxysilane, diisopropyldimethoxysilane, diphenyldimethoxysilane, methylphenyldimethoxysilane, diphenyldiethoxysilane, methyltrimethoxysilane, ethyltrimethoxysilane, vinyltrimethoxysilane, phenyltrimethoxysilane, methyltriethoxysilane, ethyltriethoxysilane, vinyltriethoxysilane, phenyltriethoxysilane, butyltriethoxysilane, ethyltriisopropoxysilane, vinyltributoxysilane, ethyl silicate, butyl silicate and methyltriaryloxysilane.

To prepare suitable solid catalysts for the objective of the present invention, the silicon compound containing an alkoxy group, which is the silicon compound containing an alkoxy group of Formula 1, the silicon compound containing an alkoxy group of Formula 2 or a mixture thereof, is preferably used in an amount ranging from 0.01 to 10 mol based on 1 mol of the magnesium compound.

Although the contact reaction temperature and main reaction conditions of the silicon compound containing an alkoxy group as an electron donor with the magnesium compound solution vary depending on kinds of the silicon compound, the magnesium solution obtained from the step (1) may be preferably maintained at a temperature ranging from −10 to 100° C., contacted with the silicon compound containing an alkoxy group, and then reacted at a temperature ranging from 0 to 130° C. for 10 minutes to 3 hours.

(3) Step for Adding a Silicon-Containing Magnesium Compound Solution in Titanium Compound The silicon-containing magnesium compound solution obtained from the step (2) by the contact reaction of the silicon compound containing the alkoxy group as an electron donor with the magnesium solution is added in a titanium compound to recrystallize a catalyst particle, thereby obtaining a solid catalyst. The titanium compound is represented by Formula 3.

$$Ti(OR)_a X_{4-a}$$ [Formula 3]

wherein R is hydrocarbon; X is a halogen atom; a is an integer ranging from 0 to 4.

The titanium compound of Formula 3 is at least one compound selected from the group consisting of: tetrahalogenated titanium such as tetrachloro titanium, tetrabromo titanium and tetraiodo titanium; trihalogenated alkoxy titanium such as trichloromethoxy titanium, trichloroethoxy titanium, tribromoethoxy titanium and tribromoisobutoxy titanium; dihalogenated dialkoxy titanium such as dichlorodimethoxy titanium, dichlorodiethoxy titanium, dichlorodiisobutoxy titanium and dibromodiethoxy titanium; and tetraalkoxy titanium such as tetramethoxy titanium, tetraethoxy titanium and tetrabutoxy titanium. Preferably, a halogen-containing titanium compound may be used, and more preferably tetrachloro titanium.

The step (3) for adding a silicon-containing the magnesium compound solution in the titanium compound may preferably comprise contacting the silicon-containing magnesium compound solution in the titanium compound at low temperature to obtain solid catalysts.

More specifically, the silicon-containing magnesium compound solution is contacted with the titanium compound at a temperature ranging from −20 to 20° C., heated to 50 to 130° C. for 10 minutes to 5 hours, reacted for 10 minutes to 5 hours and then crystallized to obtain a solid catalyst. The bulk density of the obtained polymer is decreased when the silicon-containing magnesium compound solution is added in the titanium compound at the temperature of higher than 20° C., and the process becomes complicated and high in cost due to fixation of additional low temperature maintaining apparatus when the silicon-containing magnesium compound solution is added in the titanium compound at the temperature of lower than −20° C.

The solid product obtained from the above-described process is filtered or decanted to remove unreacted materials and by-products, washed with an inert organic solvent, and suspended in the inert organic solvent for use.

The amount of titanium in the solid catalyst according to the above-described process is ranging from 3 to 20 wt %. Although the required amount of the titanium compound of Formula 3 is determined depending on kinds and the amount of solvents, alcohol and electron donors, the required amount of the titanium compound is preferably ranging from 1 to 100 mol based on 1 mol of the magnesium compound.

The present invention discloses a solid catalyst for ethylene polymerization and/or copolymerization prepared by the steps (1) through (3).

The solid titanium catalyst prepared by the above-described process has an advantageous and uniform catalyst shape, a high activity to ethylene polymerization and/or copolymerization, and produces an ethylene polymer and/or copolymer with a high bulk density, and a broad molecular weight distribution.

The solid titanium catalyst prepared by the steps (1) through (3) can be used in homo polymerization of ethylene. The solid titanium catalyst can be used for preparing an ethylene copolymer by copolymerizing ethylene with linear, branched or cyclic alphaolefin of $C_3$-$C_{14}$ such as propylene, 1-butene, 2-butene, 1-pentene, 4-methyl-1-pentene, 1-hexene, norbornene, norbornene derivatives, 2-ethyl-1-hexene, octene, decene, undecene, dodecene or tetradecene.

In the homo polymerization or the copolymerization of ethylene, the ethylene polymer or ethylene copolymer with the alphaolefin can be obtained using the solid titanium catalyst obtained from the steps (1) through (3) and a catalyst system consisting of organic metal compounds of II and III groups in the periodic table.

The organic metal compound can be represented by Formula of $MR_n$. Here, M is selected from the group consisting of: the metal elements of the II group in the periodic table such as magnesium and calcium; and the metal element of the III group in the periodic table such as boron, aluminum and gallium, wherein R is a alkyl group of $C_1$-$C_{10}$ such as methyl, ethyl, butyl, hexyl, octyl and decyl, and n is valence of the metal element. The organic metal compound preferably includes an organic aluminum compound having one or more halogen such as ethylaluminum dichlororide and diethylaluminum chloride, and trialkyl aluminum such as triethyl aluminum and triisobutyl aluminum. The polymerization reaction of the present invention can employ gas or bulk polymerization under the absence of the organic solvent, or liquid slurry polymerization under the presence of the organic solvent.

The liquid slurry polymerization is performed with the catalyst system consisting of organic metal compounds along with the solid titanium catalyst. Preferably, the concentration of the solid titanium catalyst in the polymerization reaction system ranges 1 mg to 10 mg of the catalyst (0.001 to 0.05 mmol of the titanium atom) based on 900 ml of the solvent. The solvent is selected from the group consisting of: alkane or cyclo alkane such as pentane, hexane, heptane, octane and cyclohexane; aromatic hydrocarbon such as toluene, xylene and ethylbenzene; and halogenated aromatic hydrocarbon such as chlorobenzene, chloronaphthalene and orthodichlorobenzene. Specifically, alkane such as hexane is useful for the solvent. Preferably, the concentration of the organic metal compound ranges from 0.1 to 10.0 mmol based on 900 ml of the solvent.

The polymerization is preferably performed at a temperature ranging from about 10° C. to about 110° C., more preferably, from about 50° C. to about 1001° C., in gas or liquid slurry. When the polymerization is performed in a fluidized bed, the polymerization temperature is preferably kept at less than a sintering temperature of the polymer, thereby preventing agglomeration of the polymer.

The pressure during the polymerization can be changed into higher or lower of atmospheric pressure, and preferably ranges from about 0 to 100, more preferably from 1 to 50.

The polymerization can be performed in a batch type, semi-continuous type or continuous type, and be performed in two or more steps by changing the reaction condition.

If necessary, the polymerization can be performed under the presence of inert gases (that is, non-reactive gas under the condition of polymerization). However, unfavorable catalytic poisons such as moisture, oxygen, carbon monoxide, carbon dioxide and acetylene are preferably removed in a reaction chamber.

Therefore, the solid catalyst according to the present invention produces the (co)polymer that has a high bulk density, a narrow and uniform particle size distribution and a broad molecular weight distribution, and provides a high catalytic activity so that a removal of catalyst residue is not required.

PREFERRED EMBODIMENTS

The disclosed solid catalyst for ethylene polymerization and copolymerization will be described in detail by referring to examples below, which are not intended to limit the scope of the present invention.

Example 1

Preparation of a Catalyst

The disclosed solid titanium catalyst was obtained by the following two steps.

Step 1: Preparation of Silicon-Containing Magnesium Compound Solution (A)

Under a nitrogen atmosphere, a flask (500 ml) equipped with a stirrer was filled with decane (70 ml, reactant 1) and 2 g of magnesium chloride powder (21.01 mmol, reactant II). Then, the resulting mixture was stirred at 300 rpm, and 2-ethyl hexanol (9.8 ml, reactant III) was added therein. The resulting mixture was heated to 130° C. and stirred under the nitrogen atmosphere for 2 hours, and reacted to obtain a magnesium compound solution. The magnesium compound solution was cooled at 90° C., and 3.4 g of cyclopentyl(2-phenylpropyl)dimethoxysilane (CPPDMS) (reactant IV-1, 12.21 mmol) and 2.7 g of dicyclopentyldimethoxysilane (reactant IV-2, 12.08 mmol) were added therein. The resulting mixture was reacted for 2 hours, thereby obtaining a silicon-containing magnesium compound solution (A).

Step 2: Reaction of a Titanium Compound with the Magnesium Compound Solution

The above solution was slowly added in titanium tetrachloride solution (20 ml, reactant V) kept at 7° C. for 20 minutes, and then stirred at room temperature for about 30 minutes, thereby obtaining a slurry containing a yellow solid product. The slurry was slowly heated from room temperature to 120° C., and reacted at 120° C. for 3 hours and 30 minutes, thereby obtaining a recrystallized yellow solid catalyst particle with an advantageous shape of powder. After ceasing the stirring, the solid catalyst was separated by filtering. Then, hexane was added so that the resulting mixture washed until unreacted titanium compound was no longer detected, thereby obtaining a slurry of the solid catalyst element (B) suspended in hexane.

Polymerization of Polyethylene

Step 1: Addition of the Catalyst Element

A stainless autoclave (2 L) equipped with a magnetic stirrer was filled with nitrogen, and hexane (900 ml) was added therein. Then, 15 wt % of triisobutylaluminum (600 mg, 3.06 mmol) in hexane and the slurry of solid catalyst element (B) (3 mg) were sequentially added.

Step 2: Addition of a Monomer

After an internal pressure of the autoclave was adjusted to 600 mmHg, hydrogen was added up to 3 $Kg/cm^2 \cdot G$. Then, the autoclave was stirred at 500 rpm, and adjusted at 65° C. Thereafter, while adding ethylene continuously and keeping the internal temperature at 70° C. by heating and the internal pressure at 11 $Kg/cm^2 \cdot G$, the resulting mixture was polymerized for 2 hours. After the completion of the polymerization, the reaction chamber was cooled to room temperature, then unreacted gas was removed. Thereafter, the polyethylene was taken out, separated from the solvent by filtering, and dried to obtain a white powdered polyethylene.

The activity (g-PE/g-Cata) was calculated at a ratio of weight (g) of the obtained polymer per weight of the used catalyst (g), and the bulk density (g/ml) of the obtained polymer was recorded as the ratio of the weight (g) of the polymer per unit volume (ml). The particle size distribution (PSD) was obtained by filling standard meshes with the polymer and shaking for about 10 minutes, and calculating the weight (g) of the polymer separated by each mesh divided by the total weight (g) of the polymer. The mean particle size corresponds to 50% of the weight-integrated particle size of the polymer. The melt index was obtained by calculating with the whole load of 2.16 kg under the ASTM D-1238, condition E and 190° C. and recorded as g/10 min. $FR_{10}$ was a ratio of the melt index (g/10 min) with 2.16 Kg to the melt index (g/10 min) with 21.6 Kg. As a value of the $FR_{10}$ becomes larger, the molecular weight distribution becomes broader. Table 1 shows the polymerization activity and powder characteristics of the polymer.

Example 2

The procedure of Example 1 was repeated except that cyclopentyl(trimethylsilylmethyl)dimethoxysilane (CTS-DMS) (3.0 g, 12.17 mmol) was used as the reactant IV-1 in the step 1 of the process for catalyst preparation of the Example 1, thereby obtaining a solid catalyst. Ethylene was polymerized under the polymerization condition of Example 1. The powder characteristics of the polymer after the polymerization were shown in Table 1.

Example 3

The procedure of Example 1 was repeated except that dicyclopentyldimethoxysilane (5.5 g, 24.15 mmol) was used as the reactant IV in the step 1 of the process for catalyst preparation of the Example 1, thereby obtaining a solid catalyst. Ethylene was polymerized under the polymerization condition of Example 1. The powder characteristics of the polymer after the polymerization were shown in Table 1.

Example 4

The procedure of Example 1 was repeated except that hexyl(2-phenylpropyl)dimethoxysilane (HPPDMS) (4.1 g, 13.92 mmol) as the reactant IV-1 and diisopropyldimethoxysilane (2.5 g, 14.08 mmol) as the reactant IV-2 were used in the step 1 of the process for catalyst preparation of the Example 1, thereby obtaining a solid catalyst. Ethylene was polymerized under the polymerization condition of Example 1. The powder characteristics of the polymer after the polymerization were shown in Table 1.

Example 5

The procedure of Example 4 was repeated except that hexyl(trimethylsilylmethyl)dimethoxysilane (HTSDMS) (3.7 g, 14.09 mmol) was used as the reactant IV-1 in the step 1 of the process for catalyst preparation of the Example 4, thereby obtaining a solid catalyst. Ethylene was polymerized under the polymerization condition of Example 1. The powder characteristics of the polymer after the polymerization were shown in Table 1.

Example 6

The procedure of Example 4 was repeated except that diisoproyldimethoxysilane (5.0 g, 28.16 mmol) was used as the reactant IV in the step 1 of the process for catalyst preparation of the Example 4, thereby obtaining a solid catalyst. Ethylene was polymerized under the polymerization condition of Example 1. The powder characteristics of the polymer after the polymerization were shown in Table 1.

Example 7

The procedure of Example 1 was repeated except that cyclohexyl(2-phenylpropyl)dimethoxysilane (CHPPDMS) (3.5 g, 11.97 mmol) as the reactant IV-1 and cyclohexylmethyldimethoxysilane (2.3 g, 11.98 mmol) as the reactant IV-2 were used in the step 1 of the process for catalyst preparation of the Example 1, thereby obtaining a solid catalyst. Ethylene was polymerized under the polymerization condition of Example 1. The powder characteristics of the polymer after the polymerization were shown in Table 1.

Example 8

The procedure of Example 7 was repeated except that cyclohexyl(trimethylsilylmethyl)dimethoxysilane (CHTSDMS) (3.1 g, 11.90 mmol) was used as the reactant IV-1 in the step 1 of the Example 7, thereby obtaining a solid catalyst. Ethylene was polymerized under the polymerization condition of Example 1. The powder characteristics of the polymer after the polymerization were shown in Table 1.

Example 9

The procedure of Example 7 was repeated except that cyclohexylmethyldimethoxysilane (4.6 g, 23.96 mmol) was used as the reactant IV in the step 1 of the process for catalyst preparation of the Example 7, thereby obtaining a solid catalyst. Ethylene was polymerized under the polymerization condition of Example 1. The powder characteristics of the polymer after the polymerization were shown in Table 1.

Example 10

A solid catalyst was obtained by the process for catalyst preparation of Example 1. The polymerization process of Example 1 was repeated except that the internal pressure of the autoclave was adjusted to 600 mmHg, hydrogen was added up to 3 Kg/cm$^2$·G, 1-butene (7.7 g) was added and the resulting mixture was stirred, and then the internal temperature of the autoclave was adjusted to 65° C. in the step 2 of the polymerization process of Example 1. The powder characteristics of the polymer after the polymerization were shown in Table 1.

Example 11

A solid catalyst was obtained by the process for catalyst preparation of Example 1. The polymerization process of Example 10 was repeated except that of 15 wt % triethyl aluminum (200 mg, 1.75 mmol) instead of 15 wt % triisobutyl aluminum (600 mg, 3.06 mmol) was used in the step 1 of the polymerization process of Example 10. The powder characteristics of the polymer after the polymerization were shown in Table 1.

Example 12

The procedure of Example 6 was repeated except that of decane (140 ml) was used as the reactant 1 in the step 1 of the process for catalyst preparation of Example 6, thereby obtaining a solid catalyst. Ethylene was polymerized under the polymerization condition of Example 1. The powder characteristics of the polymer after the polymerization were shown in Table 1.

Example 13

The procedure of Example 6 was repeated except that 2-ethylhexanol (8.2 ml) was used as the reactant III in the step 1 of the process for catalyst preparation of Example 6, thereby obtaining a solid catalyst. Ethylene was polymerized under the polymerization condition of Example 1. The powder characteristics of the polymer after the polymerization were shown in Table 1.

Example 14

The procedure of Example 6 was repeated except that titanium tetrachloride solution (30 ml) was used as the reactant V in the step 1 of the process for catalyst preparation of Example 6, thereby obtaining a solid catalyst. Ethylene was polymerized under the polymerization condition of Example 1. The powder characteristics of the polymer after the polymerization were shown in Table 1.

Example 15

A solid catalyst was obtained by the process for catalyst preparation of Example 3. The polymerization process of Example 3 was repeated except that of 15 wt % triethylaluminum (400 mg, 3.5 mmol) instead of 15 wt % triisobutylaluminum (600 mg, 3.06 mmol) was used in the step 1 of the polymerization process of Example 1. The powder characteristics of the polymer after the polymerization were shown in Table 1.

Example 16

A solid catalyst was obtained by the process for catalyst preparation of Example 3. The polymerization process of Example 1 was repeated except that hydrogen was added up to 1 Kg/cm$^2$·G instead of 3 Kg/cm$^2$·G in the step 2 of the polymerization process of Example 1. The powder characteristics of the polymer after the polymerization were shown in Table 1.

Comparative Example 1

The procedure of example 3 was repeated except that dicyclopentyldimethoxysilane as the reactant IV was not used in the step 1 of the process for catalyst preparation of Example 1, thereby obtaining a solid catalyst. Ethylene was polymerized under the polymerization condition of Example 1. The powder characteristics of the polymer after the polymerization were shown in Table 1.

Comparative Example 2

The procedure of example 1 was repeated except that the magnesium compound solution (A) was slowly added in the titanium tetrachloride solution (reactant V, 50 ml) kept at 25° C. for 20 minutes in the step 2 of the process for catalyst preparation of Example 1, thereby obtaining a solid catalyst. Ethylene was polymerized under the polymerization condition of Example 1. The powder characteristics of the polymer after the polymerization were shown in Table 1.

TABLE 1

The Properties of Polyethylene in Examples and Comparative Examples

| | Activity (g-PE/g-Cata) | Bulk density (g/ml) | Mean particle diameter (μm) | Melt index (g/10 min, 2.16 Kg/21.6 Kg) | $FR_{10}$ |
|---|---|---|---|---|---|
| Example 1 | 41,700 | 0.41 | 198 | 0.22/10.5 | 49.1 |
| Example 2 | 46,700 | 0.35 | 218 | 0.105/5.68 | 54.1 |
| Example 3 | 32,900 | 0.35 | 223 | 0.208/10.06 | 48.4 |
| Example 4 | 38,800 | 0.39 | 197 | 0.23/11.07 | 48.1 |
| Example 5 | 41,300 | 0.36 | 195 | 0.376/17.01 | 45.2 |
| Example 6 | 32,400 | 0.37 | 201 | 0.356/18.34 | 51.5 |
| Example 7 | 36,600 | 0.39 | 178 | 0.204/10.1 | 49.5 |
| Example 8 | 48,500 | 0.36 | 167 | 0.13/7.30 | 56.2 |
| Example 9 | 28,200 | 0.35 | 200 | 0.12/6.51 | 54.3 |
| Example 10 | 45,100 | 0.45 | 196 | 0.50/17.6 | 35.2 |
| Example 11 | 58,300 | 0.42 | 215 | 0.41/14.5 | 35.4 |
| Example 12 | 36,300 | 0.40 | 207 | 0.30/14.64 | 48.8 |
| Example 13 | 44,600 | 0.36 | 237 | 0.26/12.58 | 48.4 |
| Example 14 | 44,900 | 0.39 | 223 | 0.22/11.28 | 51.3 |
| Example 15 | 37,000 | 0.39 | 187 | 0.19/8.5 | 44.7 |
| Example 16 | 82,700 | 0.39 | 229 | 0.003/0.47 | 157.0 |
| Comparative Example 1 | 52,100 | 0.24 | 145 | 0.092/4.87 | 52.9 |
| Comparative Example 2 | 48,900 | 0.28 | 155 | 0.095/4.96 | 52.2 |

INDUSTRIAL APPLICABILITY

As discussed above, the solid titanium catalyst for ethylene polymerization and/or copolymerization of the present invention can control the mean particle size and shape of the catalyst, provide with a high polymerization activity, and its preparation process is simple. Also, the shape of the catalyst is advantageous, and the particle size of the catalyst is uniformly regulated so that an high bulk density and a broad molecular weight distribution are imparted to a produced polymer.

While the invention is susceptible to various modifications and alternative forms, specific embodiments have been shown by way of example in the drawings and described in detail herein. However, it should be understood that the invention is not limited to the particular forms disclosed. Rather, the invention covers all modifications, equivalents, and alternatives falling within the spirit and scope of the invention as defined in the appended claims.

What is claimed is:

1. A method for preparing solid catalysts for ethylene polymerization and/or copolymerization, comprising the steps of:
   (i) reacting a silicon compound containing an alkoxy group with a magnesium compound solution obtained by reacting a magnesium compound with alcohol in the presence of hydrocarbon solvent to obtain a silicon-containing magnesium solution;
   (ii) adding the silicon-containing magnesium compound solution obtained from the step (i) in a titanium compound at a temperature ranging from −20° C. to 20° C.; and
   (iii) heating the resulting mixture obtained from the step (ii) slowly to a temperature ranging from 50° C. to 130° C. for 10 minutes to 5 hours and reacting the resulting mixture at the temperature ranging from 50° C. to 130° C. for 10 minutes to 5 hours to obtain a solid catalyst particle.

2. The method according to claim 1, wherein the silicon compound containing an alkoxy group comprises a silicon compound containing an alkoxy group represented by Formula 1, a silicon compound containing an alkoxy group represented by Formula 2 or a mixture thereof in an amount ranging from 0.01 to 10 mol based on 1 mol of the magnesium compound:

$$Si(R^1)(R^2)(OR^3) \quad \text{[Formula 1]}$$

wherein $R^1$ is trimethylsilylmethyl or 2-phenylpropyl;
   $R^2$ is linear, cyclic or branched alkyl of $C_3$-$C_6$; and
   $R^3$ is alkyl of $C_1$-$C_3$.

$$R^1{}_a R^2{}_b Si(OR)_{4-(a+b)} \quad \text{[Formula 2]}$$

wherein $R^1$ and $R^2$ are individually hydrocarbon of $C_1$-$C_{12}$;
   $R^3$ is hydrocarbon of $C_1$-$C_5$; and
   a = 0 or 1, b = 0 or 1.

3. The method according to claim 2, wherein the silicon compound containing an alkoxy group represented by Formula 1 is at least one compound selected from the group consisting of cyclopentyl(2-phenylpropyl)dimethoxysilane (CPPDMS), cyclopentyl(trimethylsilylmethyl)dimethoxysilane (CTSDMS), hexyl(2-phenylpropyl)dimethoxysilane (HPPDMS), cyclohexyl(2-phenylpropyl)dimethoxysilane (CHPPDMS), n-butyl(2-phenylpropyl)dimethoxysilane (NBPPDMS), iso-butyl(2-phenylpropyl)dimethoxysilane (IBPPDMS), propyl(2-phenylpropyl)dimethoxysilane (PPPDMS), hexyl(trimethylsilylmethyl)dimethoxysilane (HTSDMS), cyclohexyl(trimethylsilylmethyl)dimethoxysilane (CHTSDMS), n-butyl(trimethylsilylmethyl)dimethoxysilane (NBTSDMS), iso-butyl(trimethylsilylmethyl)dimethoxysilane (IBTSDMS) and propyl(trimethylsilylmethyl)dimethoxysilane (PTSDMS); and wherein the silicon compound containing an alkoxy group represented by Formula 2 is at least one compound selected from the group consisting of dimethyldimethoxysilane, dimethyldiethoxysilane, dicyclopentyldimethoxysilane, cyclohexylmethyldimethoxysilane, diisopropyldimethoxysilane, diphenyldimethoxysilane, methylphenyldimethoxysilane, diphenyldiethoxysilane, methyltrimethoxysilane, ethyltrimethoxysilane, vinyltrimethoxysilane, phenyltrimethoxysilane, methyltriethoxysilane, ethyltriethoxysilane, vinyltriethoxysilane, phenyltriethoxysilane, butyltriethoxysilane, ethyltriisopropoxysilane, vinyltributoxysilane, ethyl silicate, butyl silicate and methyltriaryloxy silane.

4. The method according to claim 1, wherein the titanium compound comprises a titanium compound represented by Formula 3 in an amount ranging from 1 to 100 mol based 1 mol of the magnesium compound:

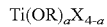 [Formula 3]

Wherein R is a hydrocarbon group, X is a halogen atom and a is an integer ranging from 0 to 4.

5. The method according to claim 1, wherein a comonomer used in ethylene copolymerization is a linear branched or cyclic alphaolefin of $C_3$-$C_{14}$.

6. The method according to claim 5, wherein the linear, branched or cyclic alphaolefin of $C_3$-$C_{14}$ is selected from the group consisting of propylene, 1-butene, 2-butene, 1-pentene, 4-methyl-1-pentene, 1-hexene, norbornene, norbornene derivatives, 2-ethyl-1-hexene, octene, decene, undecene, dodecene and tetradecene.

7. The method according to claim 1, wherein the magnesium compound is selected from the group consisting of magnesium halide, alkyl magnesium halide, alkoxy magnesium halide, aryloxy magnesium halide and dialkoxy magnesium.

8. The method according to claim 7, wherein the magnesium halide is magnesium fluoride, magnesium chloride, magnesium bromide or magnesium iodide; wherein alkyl magnesium halide is methyl magnesium halide, ethyl magnesium halide, propyl magnesium halide, butyl magnesium halide, isobutyl magnesium halide or hexyl magnesium halide; wherein alkoxy magnesium halide is methoxy magnesium halide, ethoxy magnesium halide, isopropoxy magnesium halide, butoxy magnesium halide or octoxy magnesium halide; wherein aryloxy magnesium halide is phenoxy magnesium halide or methyl phenoxy magnesium halide; and wherein dialkoxy magnesium is dimethoxy magnesium, diethoxy magnesium, dibutoxy magnesium or dioctoxy magnesium.

9. The method according to claim 2, wherein the linear, cyclic or branched alkyl is 1-hexyl, cyclohexyl, cyclopentyl, n-butyl, iso-butyl or propyl.

* * * * *